(12) United States Patent
Varadachari

(10) Patent No.: US 7,670,405 B2
(45) Date of Patent: Mar. 2, 2010

(54) PROCESS FOR THE MANUFACTURE OF A BIO-RELEASE FERTILIZER OF AN ANIONIC MICRO NUTRIENT VIZ MOLYBDENUM

(75) Inventor: Chandrika Varadachari, Kolkala (IN)

(73) Assignee: Department of Science & Technology (DST), Mumbai (IN)

( * ) Notice: Subject to any disclaimer, the term of this patent is extended or adjusted under 35 U.S.C. 154(b) by 1059 days.

(21) Appl. No.: 10/567,425

(22) PCT Filed: Aug. 6, 2004

(86) PCT No.: PCT/IN2004/000235

§ 371 (c)(1),
(2), (4) Date: Feb. 6, 2006

(87) PCT Pub. No.: WO2005/014506

PCT Pub. Date: Feb. 17, 2005

(65) Prior Publication Data

US 2007/0095119 A1    May 3, 2007

(30) Foreign Application Priority Data

Aug. 6, 2003   (IN)  ........................... 970/DEL/2003

(51) Int. Cl.
*C01B 25/40* (2006.01)
(52) U.S. Cl. ................... 71/41; 71/33; 423/306
(58) Field of Classification Search ................ 423/306; 71/33, 41
See application file for complete search history.

(56) References Cited

U.S. PATENT DOCUMENTS

| | | |
|---|---|---|
| 2,713,536 A | 7/1955 | Driskell |
| 3,574,591 A | 4/1971 | Lyons et al. |
| 3,958,973 A | 5/1976 | Roberts |

FOREIGN PATENT DOCUMENTS

| | | | |
|---|---|---|---|
| AT | 326160 | * | 11/1975 |
| IN | 172800 | | 12/1993 |
| IN | 175597 | | 7/1995 |
| IN | 177205 | | 12/1996 |
| IN | 194747 | | 11/2004 |
| SU | 1270148 | | 11/1986 |

OTHER PUBLICATIONS

Roberts, G. J. (Jul. 21, 1977) "Micronutrient Metal-Containing Phosphate Glasses" *Natl. Glass Budget*, p. 21, Abstract Only.
Mortvedt, John J. et al. "Micronutrients in Agriculture." Madison, Wisconsin: *Soil Science Am.*, 1972.
Roberts, Gordon J. "Preparation And Properties Of Glasses In The System Of FeO-$K_2O$-$P_2O_5$." *Am. Ceram. Soc. Bull.* vol. 52, No. 4 (1973), p. 383. Abstract Only.
Roberts, Gordon J. "FeO-$K_2O$-$P_2O_5$ Glasses As A Source Of Micronutrient Iron In Soil." *Am. Ceram. Soc. Bull.*, vol. 54, No. 12 (1975), pp. 1069-1071.
Ray, Sanjay K., Chandrika Varadachari and Kunal Ghosh. "Novel Slow-Releasing Micronutrient Fertilizers. 2. Zinc Compounds." *Ind. Eng. Chem. Res.*, vol. 32 (Jun. 1993), pp. 1218-1227.
Ray, Sanjay K., Chandrika Varadachari and Kunal Ghosh. "Novel Slow-Releasing Micronutrient Fertilizers. 2. Copper Compounds." *J. Agric. Food Chem.*, 45 (1997), pp. 1447-1453.

* cited by examiner

*Primary Examiner*—Wayne Langel
(74) *Attorney, Agent, or Firm*—Volpe and Koenig, P.C.

(57) ABSTRACT

This invention describes a process for the preparation of bio-release molybdenum fertilizers which comprises heating molybdenum trioxide, one or more basic compound(s) of metal(s) selected from magnesium, calcium and sodium, and phosphoric acid till a solid polyphosphate is obtained and finally obtaining the dried powder.

21 Claims, No Drawings

PROCESS FOR THE MANUFACTURE OF A BIO-RELEASE FERTILIZER OF AN ANIONIC MICRO NUTRIENT VIZ MOLYBDENUM

FIELD OF THE INVENTION

This invention relates to a process for the manufacture of a water insoluble bio-release fertilizer of an anionic micronutrient, viz., molybdenum.

BACKGROUND OF THE INVENTION

Molybdenum is a micronutrient, which is required by plants in very small amounts. At present molybdenum fertilisation is done using soluble salts like ammonium molybdate or sodium molybdate (J. J. Mortvedt, P. M. Giordano & W. L. Lindsay, 1972, Micronutrients in Agriculture, Soil Sci. Soc. Am., Madison). The disadvantage of using such soluble salts is that fertilizer use-efficiency is very low owing to leaching losses, fixation by minerals in the soil, etc. Water insoluble, slow-release forms of molybdenum fertilizers are practically unknown. Phosphate glass frits have been prepared which contain molybdenum in addition to other micronutrients (G. J. Roberts, 1977, Natl. Glass Budget. July 21). Such frits are usually prepared by fusing ammonium or sodium dihydrogen orthophosphates with micronutrient salts, at temperatures between 800° and 1400° C., to produce a melt and then rapidly cooling it by pouring on to a cold plate (G. J. Roberts 1973, Am. Ceram. Soc. Bull. Vol 52, p 383; ibid, idem, Vol 54, p 1069; Austrian Patent No 326160 of 1975; U.S. Pat. No. 3,574,591 of 1971; U.S. Pat. No. 2,713,536 of 1974; U.S. Pat. No. 3,958,973 of 1976). A Russian Patent (SU 1270148 of 1986) describes the production of a mixed metaphosphate based fertilizer containing Zn, Cu, Mo, Mn, Co, K, Na, etc. An Indian patent (No 175597 of 1991) describes the synthesis of a boron fertilizer, which is a slow-release compound.

The major disadvantage of glass frits is their process of production, which involves very high temperatures and highly corrosive melts. Another disadvantage is that, in such frits, nutrient release is controlled by hydrolysis of the compound and is dependent on soil pH, moisture conditions, etc. Therefore, rates of nutrient release may not always match crop requirements and the frits may not function as an effective nutrient source.

Another type of slow-release fertilizer has been produced in which the micronutrient ions are in a chemical form wherein they are insoluble but also plant available. These belong to the bio-release types of slow-release fertilizers. The processes for producing such phosphate based zinc and copper fertilizers are described in two Indian patents (Nos 172800 of 1990 and 177205 of 1991). The chemistry of zinc and copper phosphate polymerisation and the chemical nature of these fertilizers have also been described (S K Ray, C Varadachari & K Ghosh, 1993, Ind. Eng. Chem. Res. Vol. 32, p. 1218; S K Ray, C Varadachari & K Ghosh, 1997, J. Agric. Food Chem., vol. 45, p. 1447). Another Indian patent (Application No 10/Cal/99) describes processes for producing slow-releasing fertilizers of the cationic micronutrients.

The present invention provides processes for producing slow-releasing, water insoluble molybdenum fertilizers, which will also show good bio-availability of the nutrients and thus provide an effective source of molybdenum for plants. It also provides magnesium and phosphorous as additional plant nutrients.

OBJECTIVES OF THE INVENTION

The primary object of this invention is to propose a process for the manufacture of a new type of bio-release fertilizer of molybdenum.

Yet another object of this invention is to propose a process for the manufacture of bio-release molybdenum fertilizer, which is simple, requires lower energy than previous processes and provides an effective source of molybdenum for plants.

These and other objects of the invention will be apparent from the following paragraphs.

DESCRIPTION OF THE INVENTION

According to this invention there is provided a process for the preparation of bio-release molybdenum fertilizers which comprises heating molybdenum trioxide, one or more basic compound(s) of metal(s) selected from magnesium, calcium and sodium, and phosphoric acid till a solid polyphosphate is obtained and finally obtaining the dried powder.

When molybdenum trioxide ($MoO_3$) and a basic compound such as oxides or carbonates of magnesium and sodium, are heated with phosphoric acid, reaction occurs to form the phosphates of the metal ions, which subsequently polymerise to form magnesium sodium polymolybdophosphate.

Here polymerization occurs by removal of $H_2O$ between adjacent P—OH groups of phosphates with the formation of P—O—P bonds. Removal of free water from the system by heating facilitates the reactions. Molybdenum is incorporated into the polymer forming —P—O—P—Mo—O—P—O— type of chains.

Polymerisation is allowed to continue till almost complete, whereupon a dry, friable powdery material is formed. It is ground to a free flowing, non-hygroscopic product.

The presence of reducing impurities in any of the raw materials interferes with the process. Thus, ferrous iron which is a common impurity in phosphoric acid reduces Mo from the +VI oxidation state to the lower +III state. To avoid such reduction of Mo, an oxidant such as $MnO_2$ (pyrolusite) is added, which oxides $Fe^{2+}$ to the harmless $Fe^{3+}$ form.

Molybdenum Fertilizer

The starting materials include molybdenum trioxide (containing up to 66.6% Mo), magnesia (containing up to 60% Mg), sodium carbonate (containing up to 43.4% Na) and phosphoric acid (containing up to 60% $P_2O_5$). The weight ratio of Mo:Na:Mg:P used is, 1:0.96:2.53:6.46; the corresponding molar ratio is 1:4:10:20. Molar ratio of Mo:P may be varied between 1:5 and 1:30 without seriously affecting product properties. Molar ratio of 1:20 has been selected as the optimum so as to produce a fertilizer with low Mo levels, which are more suitable for dispersion in the soil matrix.

Amounts of Mo may be increased if desired. Reducing the ratios of Mo will lead to too low percentage of Mo in the product. Amount of Na taken is optimally at a molar ratio of 4 with respect to Mo. Levels of Na may also be increased but this does not result in any beneficial effect on the process or the product. Lower levels of Na result in a product with reduced solubility in organic chelates. Higher proportions of P will result in residual acidity in the product and lower P ratios will not yield the desired product. Amount of Mg is in the ratio Mg:P=1:2 which is sufficient to form the dihydrogen phosphate. Lower Mg ratios will result in stickiness in the final product and higher Mg will cause monohydrogen phosphates and this will reduce polymerization.

All reactants are mixed together, taken in stainless steel trays and heated in a furnace at a temperature range of 250-350° C. till dry. At the optimum temperature of 300° C., a reaction period of 90 min is required.

The final product is a dry solid. Higher temperatures may also be used with lower reaction periods but control of reaction may be difficult. At lower temperatures (e.g., 250° C.), the reaction is too slow and excessively long periods will be required. The product is ground and sieved through 100 mesh.

Alternately, sodium carbonate is dissolved in a minimum amount of water with heating, molybdenum trioxide is added and heating is continued till it is almost dissolved. Magnesium carbonate and phosphoric are mixed and the molybdate solution is added to it. The slurry is heated as described above.

The reaction may also be performed without sodium carbonate, by substituting sodium carbonate by magnesium oxide or carbonate. In such a case, the molar ratio of Mo:Mg:P=1:12:20. Here, 2 moles of Mg substitute for 4 moles of Na. The reaction is then carried out as described above.

Magnesium oxide may be substituted with magnesium carbonate, or oxides/carbonates of calcium. The molar ratios of cation:P are maintained at 2:1. Reaction is carried out as described earlier. When the reaction is carried out using calcium carbonate or oxide, product is hard and not as friable as with magnesium compound.

The principle underlying the production of molybdenum fertilizer according to the process of the present invention is that when $MoO_3$, MgO and $Na_2CO_3$ are heated with phosphoric acid, they dissolve in it forming molybdophosphates and dihydrogen phosphates of magnesium and sodium. MgO and $Na_2CO_3$ dissolve readily in phosphoric acid even at lower reaction temperatures of around 100° C. $MoO_3$ is more resistant to dissolution and requires higher reaction temperatures of about 150° C. Prior heating of $MoO_3$ with $Na_2CO_3$ produces sodium molybdate, which is then added to the phosphoric acid-magnesia system for further reaction.

When the reactants are heated to polymerisation temperatures, water ($H_2O$) is eliminated between adjacent phosphate groups forming a linear —P—O—P—O—P— chain; some Mo substitute for P in the chain forming —P—O—Mo—O—P— linkages. This is a linear negatively charged chain where the negative charges, on the O atoms bound to P and Mo, are balanced by Mg and Na. Since the product is a very long chain metaphosphate, much of the H atoms on P—OH groups are eliminated as $H_2O$ and the product has, therefore, no residual acidity. It is also dry and non-hygroscopic.

ADVANTAGES OF THE INVENTION

This invention presents a substantial improvement over previous processes for the production of slow-release molybdenum fertilizers (bio-release molybdenum fertilizers have not been produced before). The only types of slow-release fertilizer containing molybdenum, produced so far, are glass frits.

In the present process, temperatures required (around 300° C.) are much lower than for production of frits (>800° C.). Energy requirements are, therefore, much lower. Moreover, reaction conditions are also much less corrosive and stainless steel vessels can be used instead of platinum.

The product is also a much superior fertilizer, since it contains the entire Mo in a plant available form. The product is also non-toxic, non-polluting, easy to apply and exhibits increased fertilizer use-efficiency.

EXAMPLE 1

Phosphoric acid (122 g) containing 60% $PO_5$ is taken in a glass beaker and 7.5 g molybdenum trioxide ($MoO_3$ containing 66% Mo), 22 g magnesium oxide (MgO containing 60% Mg) and 11 g sodium carbonate ($Na_2CO_3$ containing 43% Na) are added to it. The mixture is stirred. Much frothing occurs due to the evolution of $CO_2$ gas from $Na_2CO_3$. This is poured into stainless steel trays and placed in a muffle furnace at 300° C. Frothing occurs during polymerisation and the surface of the solidified mass becomes bloated. After 90 min of heating, the desired product is obtained.

A sample is tested for solubility in 0.33 M citric acid and 0.1 N HCl. A clear solution is obtained within 30 min. The rest of the product is ground in a mortar and sieved through 100 mesh sieve. It contains 4.2% $MoO_3$, 50.1% $P_2O_5$ and 19.2% MgO and 2.4% $Na_2O$. Field trials with this fertilizer carried out at Baruipur, West Bengal, India showed that the yield of cabbage increased by 4750 kg/ha on application of 40 g/ha of Mo as the bio-release fertilizer. Residual effect of the fertilizer increased the yield of black gram by 230 kg/ha.

EXAMPLE 2

In this example magnesium carbonate is used instead of magnesium oxide. 84 g phosphoric acid (containing 58.5% $P_2O_5$) is taken in a beaker. To it 34.4 g magnesium carbonate (containing 84.3% $MgCO_3$) is added followed by 10.7 g soda ash (containing 68% $Na_2CO_3$), 5 g molybdenum trioxide (containing 99% $MoO_3$) and 0.3 g pyrolusite (containing 85% $MnO_2$). The reaction is carried out as described in example 1.

EXAMPLE 3

Phosphoric acid and magnesium oxide are taken as described in example 1. In a separate beaker, 11 g $Na_2CO_3$ and 7.5 g $MoO_3$ are taken, about 20 ml of water is added and the mixture is heated to boiling till the solution is almost clear. Then the molybdate solution is added to it, the solution is stirred and the reaction carried out as described in example 1.

EXAMPLE 4

In this process the proportion of Mo in the fertilizer is increased to Mo:P=1:10. Phosphoric acid (83.4 g) containing 58.5% $P_2O_5$ is taken in a glass beaker and 10 g molybdenum trioxide ($MoO_3$ containing 99.5% $MoO_3$), 34.4 g magnesium carbonate ($MgCO_3$ containing 82.3% $MgCO_3$), 21.4 g sodium carbonate ($Na_2CO_3$ containing 68% $Na_2CO_3$) and 0.3 g pyrolusite (85% $MnO_2$) are added to it. The mixture is reacted as described in example 1.

EXAMPLE 5

In this process calcium carbonate is used instead of magnesium carbonate or oxide. The process is the same as in example 2 except that instead of magnesium carbonate. 34.9 g calcium carbonate (containing 98.5% $CaCO_3$) is used. Reaction period is 30 min at 300° C. Product properties are different from the Mg-system. The product is hard and turns blue on exposure to air.

EXAMPLE 6

In this example sodium carbonate is replaced by magnesium carbonate. 83.4 g phosphoric acid (containing 58.5%

$P_2O_5$) is taken in a beaker. To it 41.4 g magnesium carbonate (containing 84.3% $MgCO_3$) is added followed by 5 g molybdenum trioxide (containing 99% $MoO_3$). The reaction is carried out as described in example 1.

I claim:

1. A process for the preparation of water insoluble, bio-release molybdenum fertilizers which comprises heating molybdenum trioxide, one or more basic compound(s) of metal(s) selected from the group consisting of magnesium, calcium and sodium, and phosphoric acid to a temperature in a range of 250 to 350° C. till a solid polyphosphate is obtained and finally obtaining dried powder.

2. A process for the preparation of bio-release molybdenum fertilizers as claimed in claim 1, wherein molybdenum trioxide and a basic compound, namely oxides or carbonates of magnesium, calcium and/or sodium, are heated with phosphoric acid.

3. A process for the preparation of bio-release molybdenum fertilizers as claimed in claim 1, wherein polymerisation is allowed to occur by removal of $H_2O$ between adjacent P—OH groups of phosphates with the formation of P—O—P bonds by heating.

4. A process for the preparation of bio-release molybdenum fertilizers as claimed in claim 3, wherein, the polymerisation is allowed to continue till almost complete, whereupon a dry, friable powdery material is formed.

5. A process for the preparation of bio-release molybdenum fertilizers as claimed in claim 4 wherein the dry material obtained is ground to a free flowing, non-hygroscopic product.

6. A process for the preparation of bio-release molybdenum fertilizers as claimed in claim 1 wherein interference by impurities in the raw materials is reduced by the addition of an oxidant, namely $MnO_2$.

7. A process for the preparation of bio-release molybdenum fertilizers as claimed in claim 1 wherein the product obtained is a magnesium sodium polymolybdophosphate.

8. A process for the preparation of bio-release molybdenum fertilizers as claimed in claim 1 wherein the starting materials include molybdenum trioxide containing up to 66.6% Mo, magnesia containing up to 60% Mg, sodium carbonate containing up to 43.4% Na and phosphoric acid containing up to 60% $P_2O_5$.

9. A process as claimed in claim 8 wherein the weight ratio of Mo:Na:Mg:P used is 1:0.96:2.53:6.46; wherein the corresponding molar ratio is 1:4:10:20.

10. A process for the preparation of bio-release molybdenum fertilizers as claimed in claim 8 wherein Mo:P is between a molar ratio of 1:5 and 1:30.

11. A process for the preparation of bio-release molybdenum fertilizers as claimed in claim 8 wherein the amount of Na is at a molar ratio of 4 with respect to Mo.

12. A process for the preparation of bio-release molybdenum fertilizers as claimed in claim 8 wherein the amount of Mg is in the ratio Mg:P=1:2.

13. A process for the preparation of bio-release molybdenum fertilizers as claimed in claim 10 wherein the starting materials include molybdenum trioxide containing up to 66.6% Mo, sodium carbonate containing up to 43.4% Na and phosphoric acid containing up to 60% $P_2O_5$.

14. A process as claimed in claim 13 wherein the molar ratio of Mo:Na:P is, 1:24:20.

15. A process for the preparation of bio-release molybdenum fertilizers as claimed in claim 10 wherein the starting materials include molybdenum trioxide containing up to 66.0% Mo, magnesia containing up to 60% Mg and phosphoric acid containing up to 60% $P_2O_5$.

16. A process as claimed in claim 15 wherein the molar ratio of Mo:Mg:P is, 1:12:20.

17. A process for the preparation of bio-release molybdenum fertilizers as claimed in claim 1 wherein all reactants are mixed together, and heated at a temperature range of 250-350° C. till dry.

18. A process for the preparation of bio-release molybdenum fertilizers as claimed in claim 17 wherein the temperature is 300° C.

19. A process for the preparation of bio-release molybdenum fertilizers as claimed in claim 1 wherein molybdenum trioxide is first heated to boiling in a solution of the base, which is selected from the group consisting of oxides and carbonates of sodium, calcium and magnesium and then further heated with phosphoric acid till dry.

20. A process for the preparation of bio-release molybdenum fertilizers as claimed in claim 10 wherein the molar ratio of Mo:P is 1:20.

21. A process for the preparation of bio-release molybdenum fertilizers as claimed in claim 10 wherein the molar ratio of Mo:P is 1:20.

* * * * *